J. Cole,
Bread Machine,
Nº 5,959. Patented Dec. 12, 1848.
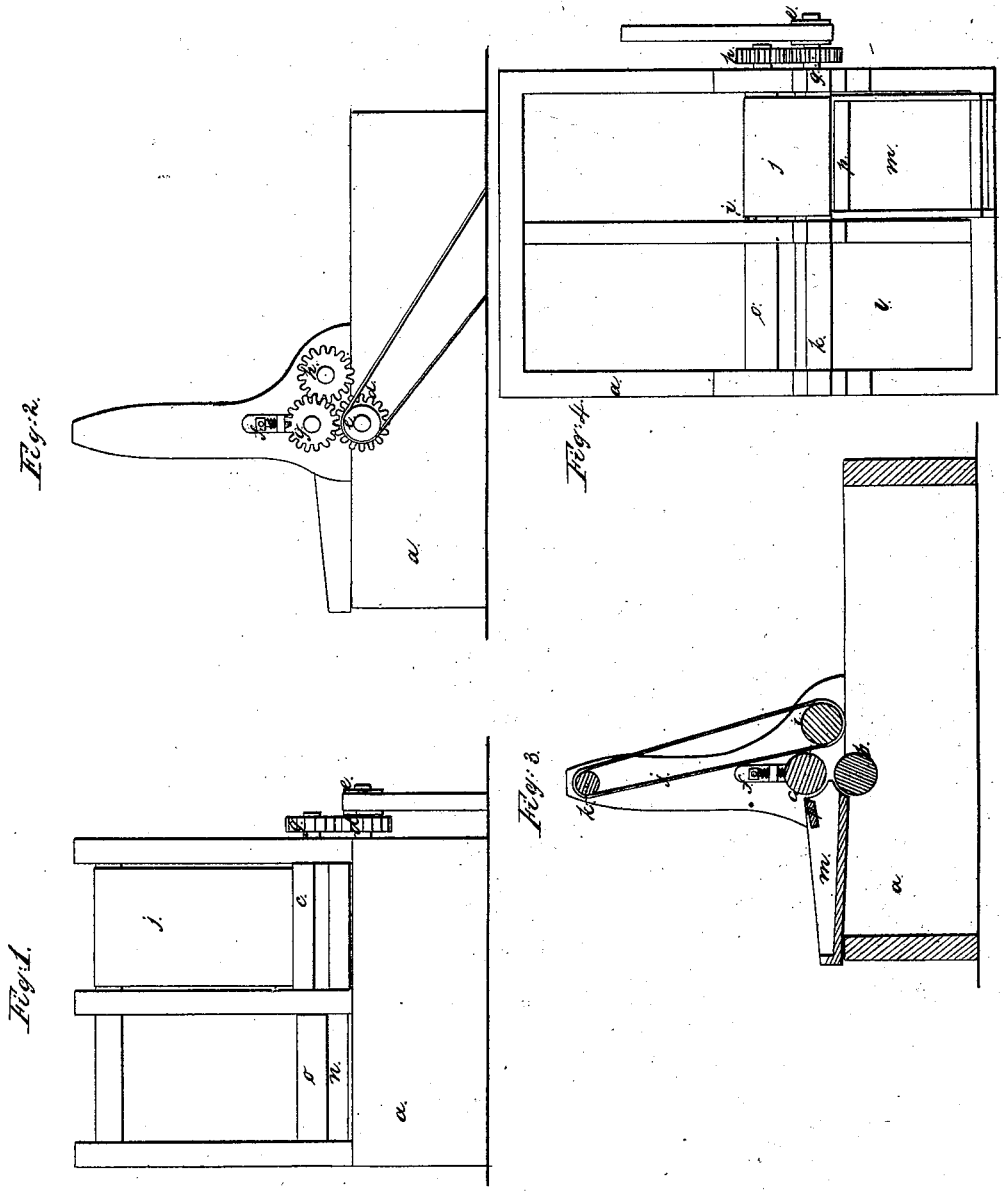

UNITED STATES PATENT OFFICE.

JAMES COLE, OF CINCINNATI, OHIO.

BREAKING AND KNEADING DOUGH.

Specification of Letters Patent No. 5,959, dated December 12, 1848.

*To all whom it may concern:*

Be it known that I, JAMES COLE, of Cincinnati, in the county of Hamilton and State of Ohio, have invented a new and useful Improvement in Machines for Rolling and Kneading or Breaking Dough, and that the following is a full, clear, and exact description of the principle or character which distinguishes it from all other things before known and of the manner of making, constructing, and using the same, reference being had to the accompanying drawings, making part of this specification in which—

Figure 1 is a front elevation of the machine; Fig. 2, a side elevation and Fig 3, a longitudinal vertical section, and Fig. 4 is a plan of the apparatus.

The same letters indicate like parts in all the figures.

Machines for breaking or kneading dough have frequently been made heretofore with a pair of rollers, consisting of a bed and upper roller, which squeeze the dough as it passes between them; but as several operations are required to complete the kneading, the dough must be frequently carried by hand from the back to the front of the rollers to repeat the operation; this of course is attended with great labor, particularly in the commencement of the operation, when the dough is in a very broken state. The object of any improvement is to avoid the labor of carrying back the dough to complete the kneading and at the same time to expedite the operation, and the nature of my invention consists in combining with the pair of breaking or kneading rollers, as heretofore used, an additional roller placed back of the bed roller, but not in contact with it, around which additional roller passes an endless apron which extends up and around another roller so as to cause the said apron to pass and press against the upper one of the pair of kneading rollers so that the dough as it passes from the kneading rollers shall be carried up between the apron and the upper roller and over this latter to be delivered on to the table in front to be returned to the kneading rollers.

In the accompanying drawings (*a*) represents a frame of any desired form and structure adapted to the purpose and (*b*, *c*) a pair of rollers one placed above the other. The lower or bed roller (*b*) has its bearings in permanent boxes with the shaft extending out to receive a cog wheel (*d*) that communicates motion to the other rollers, and also for a pulley (*e*) by which the machine is driven by a belt from some first mover. The upper roller (*c*) has its bearings in sliding boxes provided with set screws (*f, f*) in the usual manner for regulating the distance between the two rollers the shaft of this roller (*c*) being also provided with a cog wheel (*g*) that receives motion from the cog wheel of the bed roller. This cog wheel (*g*) engages and drives a cog wheel (*h*) on the shaft of a third roller (*i*) back of the bed roller but not in contact with it the said back roller having its bearings in permanent boxes and its surface being adapted to receive an endless apron (*j*) which passes around it, and a fourth roller (*k*) above and so situated that the apron shall be pressed gently against the roller (*c*).

In front of the kneading rollers there is a table (*l*) on which the attendant prepares the materials to be worked or kneaded into dough and from which he delivers it at the proper time to the bight of the rollers (*b*) and (*c*) by which it is carried through, and as it passes through it comes against the surface of the apron which moving upward causes it to pass up between the surface of the belt and the roller (*c*) over which it passes on to the table where the attendant takes it and delivers it again to the kneading rollers. In this way the operation is continued until the dough is thoroughly kneaded. The operator then transfers the dough to a table (*m*) by the side of, and similar to the one described, and causes it to pass between two rollers (*n*) and (*o*) similar to the rollers (*b*) and (*c*) but placed nearer together for the purpose of rolling the dough into a sheet as is required for a machine for cutting it into crackers, biscuit, &c. The lower roller (*n*) is attached to the shaft of the roller (*b*) and therefore the two rotate together, but the roller (*o*) is simply a pressure roller the journals of which run in adjustable boxes in manner similar to the roller (*c*). The tables are provided with sides to prevent the material on them from dropping off, and with a bar (*p*) in front of the upper rollers of the two pairs to protect the hands of the operator from the action of the rollers.

What I claim as my invention and desire to secure by Letters Patent is—

The elevating apron that passes around the rollers (*i*) and (*k*) in combination with the kneading or breaking rollers, substantially as described, for the purpose of carrying the dough back to the table after it has passed between the kneading rolls as described, but I do not claim this combination when the apron passes around the kneading or breaking rollers, as this has been done before but without success.

JAMES COLE.

Witnesses:
 WM. H. GRISWOLD,
 JAMES SHIELD.